US011093603B2

(12) United States Patent
Lacaze et al.

(10) Patent No.: US 11,093,603 B2
(45) Date of Patent: Aug. 17, 2021

(54) SYSTEM AND METHOD FOR PROTECTING SOFTWARE FROM BUFFER OVERRUNS

(71) Applicant: Robotic Research, LLC, Gaithersburg, MD (US)

(72) Inventors: Alberto Daniel Lacaze, Potomac, MD (US); Karl Murphy, Rockville, MD (US)

(73) Assignee: Robotic Research, LLC, Clarksburg, MD (US)

( * ) Notice: Subject to any disclaimer, the term of this patent is extended or adjusted under 35 U.S.C. 154(b) by 172 days.

(21) Appl. No.: 15/245,262

(22) Filed: Aug. 24, 2016

(65) Prior Publication Data

US 2017/0132410 A1     May 11, 2017

Related U.S. Application Data

(60) Provisional application No. 62/209,994, filed on Aug. 26, 2015.

(51) Int. Cl.
*G06F 21/52*     (2013.01)
*G06F 21/55*     (2013.01)
*G06F 8/52*      (2018.01)

(52) U.S. Cl.
CPC .............. *G06F 21/52* (2013.01); *G06F 8/52* (2013.01); *G06F 21/554* (2013.01); *G06F 2221/033* (2013.01)

(58) Field of Classification Search
CPC .......... G06F 21/52; G06F 8/52; G06F 21/554; G06F 2221/033
See application file for complete search history.

(56) References Cited

U.S. PATENT DOCUMENTS

| 7,577,992 B2* | 8/2009 | Abadi | G06F 21/52 726/22 |
| 7,669,243 B2* | 2/2010 | Conti | G06F 21/52 726/22 |
| 8,522,349 B2* | 8/2013 | Crume | H04L 63/1466 726/23 |
| 8,990,930 B2* | 3/2015 | Burrell | G06F 21/54 726/22 |
| 8,990,934 B2* | 3/2015 | Pavlyushchik | G06F 21/00 726/22 |
| 2004/0034794 A1* | 2/2004 | Mayer | G06F 21/567 726/23 |
| 2005/0097246 A1* | 5/2005 | Chen | G06F 21/14 710/56 |

(Continued)

*Primary Examiner* — Yonas A Bayou
(74) *Attorney, Agent, or Firm* — RowanTree Law Group, PLLC; Carson C. K. Fincham

(57) ABSTRACT

A compiler transforms the source code into object code, but it will postpone the assignment of all of the machine language jumps until installed time. This can be performed by labeling the jumps during compiled time, similarly to how variables are labeled for later indexing by the debugger. At installation time, given a random key, the installer will take the jump labels and assign random ordering of the code and data using the key as a seed. The final effect is that the same source code can potentially generate an infinite number of object codes, with the exact same functionality of execution. The main difference, however, is that as more jump labels are included, less fixed offsets between buffers are available to the black hat.

10 Claims, 2 Drawing Sheets

Source code

Object code 1

Object code 2

(56) References Cited

U.S. PATENT DOCUMENTS

| | | | | |
|---|---|---|---|---|
| 2006/0259435 A1* | 11/2006 | Moritzen | ............... | G06F 21/52 |
| | | | | 705/57 |
| 2007/0245419 A1* | 10/2007 | Omahony | ............... | G06F 21/52 |
| | | | | 726/23 |
| 2008/0148399 A1* | 6/2008 | Winkler | ............... | G06F 21/52 |
| | | | | 726/22 |
| 2012/0254995 A1* | 10/2012 | Sallam | ............... | G06F 21/566 |
| | | | | 726/22 |
| 2012/0255004 A1* | 10/2012 | Sallam | ............... | G06F 21/554 |
| | | | | 726/23 |
| 2012/0255012 A1* | 10/2012 | Sallam | ............... | H04L 63/145 |
| | | | | 726/24 |
| 2014/0317742 A1* | 10/2014 | Edwards | ............... | G06F 21/56 |
| | | | | 726/23 |

* cited by examiner

SYSTEM AND METHOD FOR PROTECTING SOFTWARE FROM BUFFER OVERRUNS

CROSS REFERENCE TO RELATED APPLICATIONS

This application claims priority from U.S. Patent Application Ser. 62/209,994, entitled "System and Method for Protecting Software from Buffer Overruns", filed on Aug. 26, 2015 The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to protecting software from hackers. More specifically, the present invention relates to the protection of software from buffer overruns that can create a vulnerability exploitable by hackers.

BACKGROUND OF THE INVENTION

Buffer overruns occur when memory is overwritten with data or code that is larger than the originally anticipated/allocated space. Many computer "bugs," created by poor programming, result in buffer overruns. These logical mistakes within the code cause data which would normally be stored within the boundaries of an allocated area in memory to spill over into other areas, with possible adverse consequences.

In most cases when an overrun occurs, it overwrites areas of data or code that are protected by the operating system (or hardware); therefore, it causes an exception, and the execution of the program is stopped. Other times, the overrun affects areas that are not protected by the operating system, causing a variety of detrimental outcomes.

Often, the buffer overrun affects portions of the data that, at first glance, do not interfere with the operation of the program; instead, they affect areas of storage that are either unused or unexercised by the software (thereby not causing detrimental effects).

These latent bugs can become time bombs that can create a different, more detrimental outcome when, for example, the code is recompiled with different parameters, when some of the libraries or compilers change the order of the allocation of the data (or code), or when the affected part of the code or data starts being utilized.

Buffer overruns are also used for cyber attacks. Black hat programmers use buffer overruns to introduce Trojans: carefully tailoring messages that use the buffer overrun to place malicious code into memory which will provide the programmer's desired effect.

DEFINITIONS

"Black hat" is used to describe a hacker or cracker who breaks into a computer system or network with malicious intent.

In computer science, a data buffer (or just buffer) is a region of a physical memory storage used to temporarily store data while it is being moved from one place to another.

"Buffer overruns" occur when memory is overwritten with data or code that is larger than the originally anticipated/allocated space.

A "hacker" is one who uses programming skills to gain illegal access to a computer network or file.

A software bug is an error, flaw, failure, or fault in a computer program or system that causes it to produce an incorrect or unexpected result, or to behave in unintended ways.

SUMMARY OF THE INVENTION

The present invention is designed to thwart the black hat, by randomizing the offsets between the location of the beginning of the memory space (being used to create the buffer overrun—Allocation 1 in the figure), and the location of the position where the Trojan would be able to perform the operation desired by the black hat. The same system is useful to detect the overruns created by non-malicious users, and therefore, it is an important debugging tool.

Exploits of buffer overruns are possible because offsets between different parts of memory are predictable and repeatable. If these offsets are changed, the work of the black hat becomes nearly impossible. In other words, if the offsets between the location being overrun, and the desired target location of the Trojan, are different for each machine, then the black hat will have to generate a different message to deliver the Trojan for each computer. More importantly, he will not be able to test the Trojan in its version of the object code. The invention described in this patent is a method for postponing the location assignment of different parts of the code and data to installation time, rather than compilation time, when conventionally performed.

Currently, a traditional compiler deterministically assigns the location of each part of the code and statically allocated data at compiled time. This object code is then distributed with the installer in the exact same object code, when installed on a user computer.

In the system of the present invention, a compiler still transforms the source code into object code, but it will postpone the assignment of all of the machine language jumps until installed time. This can be performed by labeling the jumps during compiled time, similarly to how variables are labeled for later indexing by the debugger. At installation time, given a random key, the installer will take the jump labels and assign random ordering of the code and data using the key as a seed. The final effect is that the same source code can potentially generate an infinite number of object codes, with the exact same functionality of execution. The main difference, however, is that as more jump labels are included, less fixed offsets between buffers are available to the black hat.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Buffer overruns occur when memory is overwritten with data or code that is larger than the originally anticipated/allocated space. Many computer "bugs," created by poor programming, result in buffer overruns. These logical mistakes within the code cause data which would normally be stored within the boundaries of an allocated area in memory to spill over into other areas, with possible adverse consequences.

In most cases when an overrun occurs, it overwrites areas of data or code that are protected by the operating system (or hardware); therefore, it causes an exception, and the execution of the program is stopped. Other times, the overrun affects areas that are not protected by the operating system, causing a variety of detrimental outcomes.

Often, the buffer overrun affects portions of the data that, at first glance, do not interfere with the operation of the program; instead, they affect areas of storage that are either unused or unexercised by the software (thereby not causing detrimental effects).

These latent bugs can become time bombs that can create a different, more detrimental outcome when, for example, the code is recompiled with different parameters, when some of the libraries or compilers change the order of the allocation of the data (or code), or when the affected part of the code or data starts being utilized.

Buffer overruns are also used for cyber attacks. Black hat programmers use buffer overruns to introduce Trojans: carefully tailoring messages that use the buffer overrun to place malicious code into memory which will provide the programmer's desired effect.

Figure 1:
FIG. 1. Compound message intended for Allocation 1.

FIG. 1 shows a compound message intended for Allocation 1. The message is composed of random data and a Trojan area. The random data is designed to overrun the space allotted for Allocation 1, and to place the Trojan at exactly the right position, allowing it to correctly affect the data within the Allocation 2 space. Although this is a simple example, there are more complicated scenarios where the buffer overrun may create a set of cascading events, culminating in the effects desired by the black hat.

It is important to note that the reason these methods work—as far as a mechanism for inserting malicious code—is that the memory offsets between the beginning of Allocation 1, and the exact desired location of the Trojan as part of Allocation 2, are fixed and deterministic. In other words, if a black hat tries to insert this Trojan into a system, the exact same offsets will provide the same effect on a different computer for another user.

Languages like JavaScript and C# attempt to minimize the number of buffer overruns introduced by programmers by performing internal checks on the data access; they effectively restrict programmers from accessing the memory locations directly. These methods, however, have significant disadvantages. They tend to significantly slow down code execution, because the runtime engine needs to check boundaries. More importantly, most attacks are performed on the runtime libraries of these languages, which are written in other languages without these restrictions.

The present invention is designed to thwart the black hat, by randomizing the offsets between the location of the beginning of the memory space (being used to create the buffer overrun—Allocation 1 in the figure), and the location of the position where the Trojan would be able to perform the operation desired by the black hat. The same system is useful to detect the overruns created by non-malicious users, and therefore, it is an important debugging tool.

Exploits of buffer overruns are possible because offsets between different parts of memory are predictable and repeatable. If these offsets are changed, the work of the black hat becomes nearly impossible. In other words, if the offsets between the location being overrun, and the desired target location of the Trojan, are different for each machine, then the black hat will have to generate a different message to deliver the Trojan for each computer. More importantly, he will not be able to test the Trojan in its version of the object code. The invention described in this patent is a method for postponing the location assignment of different parts of the code and data to installation time, rather than compilation time, when conventionally performed.

Currently, a traditional compiler deterministically assigns the location of each part of the code and statically allocated data at compiled time. This object code is then distributed with the installer in the exact same object code, when installed on a user computer.

In the system of the present invention, a compiler still transforms the source code into object code, but it will postpone the assignment of all of the machine language jumps until installed time. This can be performed by labeling the jumps during compiled time, similarly to how variables are labeled for later indexing by the debugger. At installation time, given a random key, the installer will take the jump labels and assign random ordering of the code and data using the key as a seed. The final effect is that the same source code can potentially generate an infinite number of object codes, with the exact same functionality of execution. The main difference, however, is that as more jump labels are included, less fixed offsets between buffers are available to the black hat.

For example, if two jump labels are included for a single "if" question in the code (i.e., for the "if" part and "else" part), then the installer will be able to generate at least two different object codes: one with the "positive" part first, and one for the "negative" part first. If this is performed for n jump labels, then the installer will be able to generate $2^n$ different object codes.

By using jumps already included in the source code, the proposed method will not add significant extra execution delays (other than paging effects, which will be addressed later). However, if desired for further security, the installer may purposefully add jumps into the object code to increase the randomization of the object code, therefore generating an even larger variety of outcomes. The same randomization can be performed by shifting the order of the statically allocated variables and constants. At runtime, the dynamic allocation can also be randomized by allocating ad hoc variables in the stack, or by utilizing an allocation scheme that uses a key to randomize the space.

Figure 2:
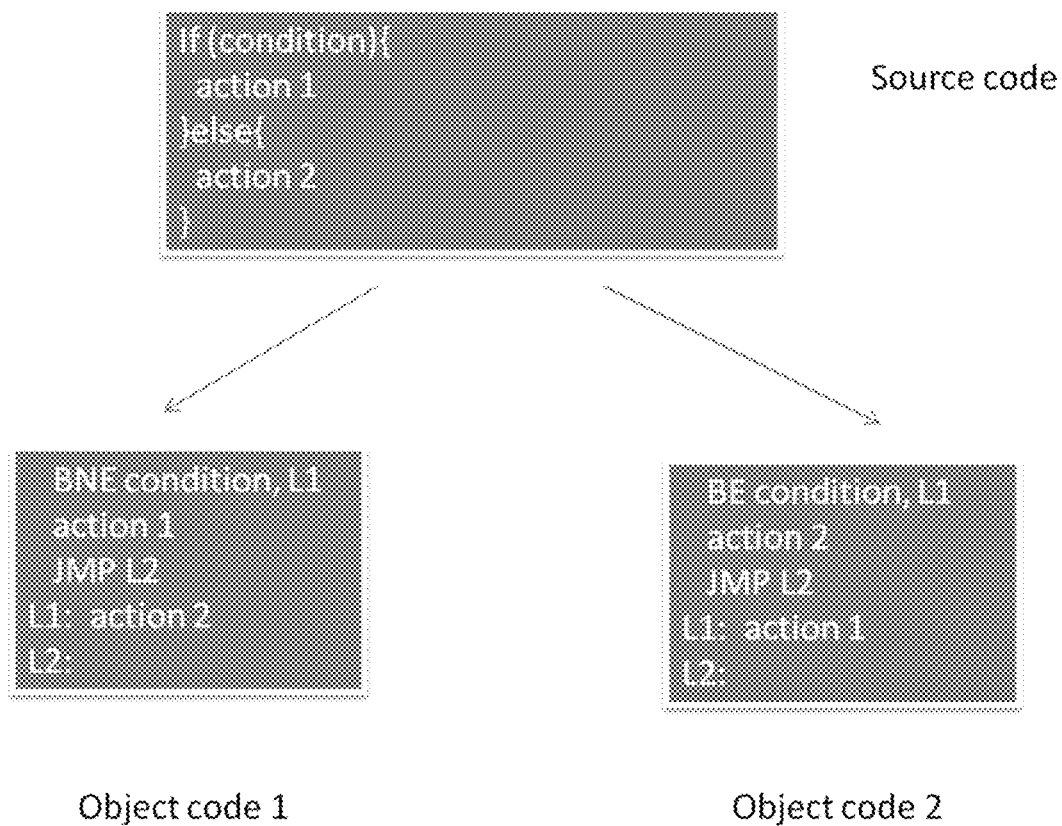
FIG. 2. Simple example of the randomization of the object codes.

FIG. 2 shows a simple example of the randomization of the object codes. In this case, the branch is performed with the BNE (Branch on Not Equal) in one version of the code, and with BE (Branch Equal) on the second installation of the object code. As shown, the memory location of action 1 is different from one object code to the other. Therefore, a buffer overrun that is meant to insert a Trojan on action 1 for the first source code will add junk to action 2 on the second object code, and therefore, it will not have the same effect as desired by the black hat.

Many programmers spend a significant amount of time trying to find buffer overruns, as they are not often easy to track. The system presented in this patent has significant advantages from the debugging standpoint. If several different instances of the randomized object code are executed, a specialized debugger can be used to "deshuffle" code and data, comparing the execution of these multiple instances. Since the multiple instantiations of the shuffled code will be affected in different areas by a buffer overrun, then the unshuffled versions will differ immediately after the buffer overrun has occurred, even if no adverse effect to the execution has occurred. This is significant, as the system will discover buffer overruns that cause latent bugs, even if the output of all the different instantiations are identical.

A possible instantiation of the system of the present invention is implemented utilizing a multicore (or multi-threaded) processor that runs multiple instantiations of the randomized object code. The advantage of such a system is that, as presented in the previous section, buffer overruns will affect the various instantiations differently, and therefore create a mechanism to discover if something has gone wrong. In other words, the execution of the different object codes should be identical, except when a buffer overrun occurs. The overrun will create a divergence from the executions. Hardware accelerated de-shuffling and comparing modules can perform memory checks, and therefore verify the integrity of the data and software.

It is important to note that this method will not only detect buffer overruns that are entered into the system through outside messages, but also detect exploits that utilize the hardware where these machines are operating. The disclosed hardware is inherently safer from these kinds of attacks, no matter what part of the system the black hat is attempting to attack.

A specialized compiler that is capable of storing labels for jumps in the code, which can be shuffled using a key at install time. An installer that utilizes a key to create a unique object code, by shuffling these jumps in the object code.

An installer that can examine an object code compiled with a conventional compiler and find (or add) jump locations, which are then shuffled to randomize the offsets of the different code and data. This installer will then shuffle the code and data to create unique object codes based on a key.

An operating system that shuffles the object, as described above, before execution or at load time.

Finally, these randomized object codes can be executed on conventional computers, or there could be a specialized computer that is designed to run multiple instantiations of the object code (and possibly have hardware accelerators to deshuffle and compare the unshuffled code for changes that will indicate buffer overruns).

The proposed system has several unique advantages. It will work no matter what source code is used. The same method can be used in any computer language. It does not require changing any source code. Any legacy code can be recompiled and reinstalled to obtain the buffer overrun protection and detection. It does not require programmers to learn a new language or any language modifications. It can be universally used with any software, operating system, drivers, application, runtime libraries, etc. It can be used to detect latent bugs that may not affect the output of the program. It can be used as a powerful debugging tool that detects buffer overruns immediately after they happen, rather than after the effect of the overrun has cascaded through the program. It can be used to build computer hardware that will be significantly more secure without having significant execution penalties. It is an effective tool to defend against malicious viruses and worms that use buffer overruns as entry points.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method designed to detect and defend against buffer overruns, executable by a machine, comprising:
    providing an application that is compiled in object code, wherein the compiling identifies at least one jump point in the object code; and
    providing a specialized installer that, upon execution, randomizes the object code at the instruction level by assigning a random memory location for the at least one jump in the object code.

2. The method in claim 1, wherein the installer detects the object code generated by a conventional compiler, removes any memory allocation data, and uses the at least one jump point to generate the random memory locations assignment.

3. The method in claim 1 or 2, wherein the installer randomizes the object code based on a key or random seed.

4. The method in claim 1 or 2, where the randomization is not based on a derivate of the time.

5. The method in claim 1 or 2, wherein the at least one jump point in the object code is complemented with at least one new jump point added by the installer.

6. The method in claim 1 or 2, wherein the installer alters the object code by changing the location of statically allocated variables or constants.

7. The method in claim 1, 2, or 6, wherein the installer causes an allocating and deallocating of arbitrary memory chunks to force random offsets between the data allocated and the other data and code.

8. A method of providing enhanced installed application security, comprising:
  compiling, by a compiler executed by a processing device, source code for an application, thereby generating object code for the application, wherein the object code comprises at least one labeled jump point, and wherein the compiling comprises postponing a memory location assignment for the at least one labeled jump point;
  installing, by an installer, the application, wherein the installing comprises (i) identifying a random key and (ii) assigning, based on the random key, a memory location to the at least one labeled jump point.

9. The method of claim 8, wherein the installing further comprises (iii) adding at least one additional jump point to the object code and (iv) assigning a memory location to the at least one additional jump point.

10. The method of claim 8, wherein the installing further comprises (iii) shifting an order of at least one: (a) statically allocated variable, and (b) statically allocated constant.

* * * * *